(12) United States Patent
Rajvanshi et al.

(10) Patent No.: US 11,851,058 B2
(45) Date of Patent: Dec. 26, 2023

(54) ENHANCED VEHICLE OPERATION (71) Applicant: Ford Global Technologies, LLC, Dearborn, MI (US)

(72) Inventors: Akshat Rajvanshi, Novi, MI (US); Benjamin Maus, Düsseldorf (DE); Jens Kotte, Geilenkirchen (DE); Nitendra Nath, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 17/369,310

(22) Filed: Jul. 7, 2021

(65) Prior Publication Data
US 2022/0024454 A1 Jan. 27, 2022

(30) Foreign Application Priority Data
Jul. 24, 2020 (DE) .......................... 102020209353.9

(51) Int. Cl.
*B60W 30/14* (2006.01)
*B60W 50/06* (2006.01)
*B60W 50/00* (2006.01)

(52) U.S. Cl.
CPC .......... *B60W 30/143* (2013.01); *B60W 50/06* (2013.01); *B60W 2050/0088* (2013.01); (Continued)

(58) Field of Classification Search
CPC ............... B60W 30/143; B60W 50/06; B60W 2050/0088; B60W 2420/42;
(Continued)

(56) References Cited

U.S. PATENT DOCUMENTS 11,548,526 B2 * 1/2023 Batts ............... B60W 60/00186
11,614,340 B2 * 3/2023 Kim ...................... G01C 25/00
702/104

(Continued)

FOREIGN PATENT DOCUMENTS

CN          105128857 A     12/2015
DE    102012215465 A1    3/2014

(Continued)

OTHER PUBLICATIONS

Wolfgang Hahn, Feb. 24, 2017, English Machine Translation_DE102017/203037A1 provided by Patent Translate by EPO and Google (Year: 2017).*

(Continued)

*Primary Examiner* — Peter D Nolan
*Assistant Examiner* — Ashley L Redhead, Jr.
(74) *Attorney, Agent, or Firm* — Frank A. MacKenzie; Bejin Bieneman PLC (57) ABSTRACT

At least one object is detected, via a sensor, in a direction of movement ahead of a host vehicle. A current sensor range is determined based on the detected at least one object. A maximum sensor range is determined based on the sensor. The current sensor range is compared with the maximum sensor range. Upon determining the current sensor range is less than the maximum sensor range by at least a predetermined threshold, driving parameters of the host vehicle are updated based on the current sensor range.

20 Claims, 7 Drawing Sheets

(52) U.S. Cl.
CPC ..... *B60W 2420/42* (2013.01); *B60W 2420/52* (2013.01); *B60W 2552/53* (2020.02); *B60W 2554/4045* (2020.02); *B60W 2554/802* (2020.02); *B60W 2554/804* (2020.02); *B60W 2555/60* (2020.02)

(58) Field of Classification Search
CPC ......... B60W 2420/52; B60W 2552/53; B60W 2554/4045; B60W 2554/802; B60W 2554/804; B60W 2555/60; B60W 2554/4042; B60W 30/16; B60W 2720/10
See application file for complete search history.

(56) References Cited

U.S. PATENT DOCUMENTS

| | | | | |
|---|---|---|---|---|
| 2017/0219338 | A1* | 8/2017 | Brown | G01S 17/87 |
| 2017/0349178 | A1 | 12/2017 | Suzuki | |
| 2019/0088148 | A1* | 3/2019 | Jacobus | G08G 1/096716 |
| 2019/0193730 | A1 | 6/2019 | Voorheis | |
| 2019/0313073 | A1* | 10/2019 | Patel | H04N 23/843 |
| 2020/0223450 | A1* | 7/2020 | Iwamoto | B60W 60/00 |
| 2020/0339080 | A1* | 10/2020 | Ohmura | B60W 30/0953 |
| 2020/0339114 | A1* | 10/2020 | Ohmura | B60W 30/095 |
| 2020/0339151 | A1* | 10/2020 | Batts | B60Q 5/005 |
| 2022/0219629 | A1* | 7/2022 | Suenaga | B60R 25/403 |

FOREIGN PATENT DOCUMENTS

| | | | | |
|---|---|---|---|---|
| DE | 102014212216 A1 * | 12/2015 | ........... | G01S 13/867 |
| DE | 102014212216 A1 | 12/2015 | | |
| DE | 102017203037 A1 * | 8/2018 | | |
| DE | 102017203037 A1 | 8/2018 | | |
| DE | 102018127714 A1 | 5/2020 | | |

OTHER PUBLICATIONS

Ralph Grewe, Jun. 17, 2014, English Machine Translation_DE102014/ 212216A1 provided by Patent Translate by EPO and Google (Year: 2014).*

German Search Report as issued by the German Patent Office dated Feb. 10, 2021 (in German).

* cited by examiner

ENHANCED VEHICLE OPERATION

CROSS-REFERENCE TO RELATED APPLICATIONS

This patent application claims priority to German Application No. 102020209353.9, filed Jul. 24, 2020, which is hereby incorporated herein by its reference in its entirety.

BACKGROUND

A series of sensor signals are required for driver assistance systems (advanced driver assistance systems, ADAS) and automated systems. For controlling the movement of the vehicle in the longitudinal and lateral directions, it is already especially important in L1 applications (SAE International classification; L0: no automated driving, L1: driving assistance for a self-driving driver, L2: partially automated driving, L3: conditionally automated driving, L4: highly automated driving, L5: fully automated driving) to detect road lanes and objects on a roadway. For controlling the speed of the corresponding vehicle, a certain range of the sensors used is necessary. External influences such as weather conditions and dirty sensors have an unfavorable effect on the range of the sensors. In conventional systems, if it is detected that the sensors are faulty, the system is switched off and the driver is informed.

Switching off a driver assistance system may lead to inefficiency. For example, a longer sensor range may be necessary for an adaptive cruise control than for an emergency brake assistant, but they are inactivated simultaneously during a system shutdown. For modern driver assistance systems, especially for L3 and higher classifications, control of the system for automated driving while taking into account a limited sensor range would be desirable.

SUMMARY

The present disclosure relates to a method for controlling a vehicle with a driver assistance system by determining a current sensor range and controlling a vehicle based on the current sensor range.

The method for controlling a host vehicle while determining a current sensor range, wherein the vehicle has a sensor, a driver assistance system and a control device, includes:
  detecting, via the sensor, at least one object in a direction of motion ahead of the host vehicle,
  determining the current sensor range based on the detected at least one object,
  determining the maximum sensor range based on the sensor,
  comparison of the current sensor range with the maximum sensor range,
  upon determining the current sensor range is less than the maximum sensor range by at least a predetermined threshold, updating the driving parameters of the host vehicle based on the current sensor range.

The method according to the present disclosure is advantageous because the driver assistance system can work with knowledge of the current sensor range. When a limited sensor function is detected, the system is not switched off, but the sensors continue to be used and the measurement results are taken into account when automatically controlling a host vehicle.

The method is suitable for vehicles with a driver assistance system, especially from the L3 level upwards. Driving parameters are characteristics which characterize the movement of the vehicle, especially the speed of the vehicle, and further, for example, braking behavior and acceleration behavior, without being limited to this list. Depending on the degree of automation, for example, a maximum speed can be suggested to the driver of the corresponding vehicle or can be set automatically. This means, for example, that the current maximum speed is reduced when a limited sensor range is determined. Furthermore, the time in which certain decisions have to be made to drive straight ahead can be adapted to the current sensor range.

Accordingly, the control strategy is adapted to the lateral driving behavior: with a short sensor range, it is characterized by fast decisions and corresponding abrupt control movements, with a long sensor range there is more time for balanced decisions and gentle control movements. The method also makes it possible to adjust the control strategy if few objects are detected, for example, the lane control can be controlled more strictly when driving straight ahead.

The object to be detected may lie outside a roadway and in the area of a roadway on which the host vehicle is moving. A roadway is especially understood to be a paved road made of asphalt, concrete or similar. The method is also suitable for unpaved roads and terrain. Outside the roadway, for example, environmental features such as plants, especially trees, or artificial structures, for example, buildings, are detected. In the area of the roadway, for example, road markings, guardrails, traffic signs and other vehicles, especially moving vehicles, are detected.

The maximum range of the sensor is an empirically determined longest distance from the host vehicle in which objects can be detected, which is determined during the operation of the host vehicle. It is assumed from this that, within a certain period of time after the start of operation, a sufficient number of objects is detected for stable information. Alternatively, or in combination with the specified duration, a minimum number of detected objects can be set. It is particularly advantageous if the maximum sensor range is checked repeatedly during continuous repetition of the method and, if necessary, is redefined. The distance of objects can be determined, for example, by comparison with known distances of objects of the same or similar size.

The objects are preferably selected from the group containing target vehicles, road signs, road boundaries, road markings, and plants in the area of the roadway.

Preferably, the sensor is selected from the group containing a camera, a radar device, and a lidar device. Of course, the selection is not limited to these devices, other suitable sensors can also be used. Switching between the sensors used is possible. Multiple sensors can also be used at the same time.

Preferably, with the method according to the present disclosure, the sensor range is determined using object representation based on other vehicles. Advantageously, the maximum sensor range as well as the current sensor range can be determined particularly accurately. Target vehicles that move at a different speed than the host vehicle are preferably selected as objects, wherein the faster vehicles are tracked up to a distance and a time until they can no longer be detected, and the slower ones are tracked from a distance and a time at which they were first detected.

In this process, target vehicles that move at the same speed as the host vehicle are preferably removed from the analysis. Target vehicles that have passed out of the sensor range by concealment by other target vehicles, lane changing and/or cornering, or which have passed into the sensor range after concealment by other target vehicles, lane changing and/or cornering, are also preferably removed from the analysis. These target vehicles are thus eliminated. If the target vehicles which are still in the analysis are then no longer detected, they are highly likely to have passed out of the sensor range, or if they are just being detected, they are highly likely to have just passed into the sensor range, i.e., at the point of the current sensor range or possibly the maximum sensor range.

Preferably, with the method according to the invention the current sensor range is determined by checking objects corresponding to certain distances by means of image processing. For this purpose, for example, image processing algorithms (for example, the Canny algorithm, the Hough transform) are used, which detect the most distant objects (for example, road markings, road edges, guardrails) and associate a distance therewith.

With the method according to the present disclosure, pixels in at least one selected area of the image are preferably assessed by means of image processing, wherein certain colors of pixels correspond to certain scenarios causing a limited sensor range. For checking the current sensor range, the system can detect the highest point in the image with different colored pixels in the image area in which the pixels change exclusively to white towards the upper area of the image, for example, and can associate a certain distance therewith. This distance would then correspond to the current sensor range. For example, this is the case with fog, rain or snow limiting the sensor range, in which there are only white pixels in the upper image area and no colored pixels corresponding to features such as a blue sky, trees, or traffic signs. In conjunction with other signals (for example, of precipitation sensors), the environmental or weather conditions can be specified and signaled to the driver. A limited sensor range would then be signaled in the host vehicle. For example, a sandstorm limiting the sensor range can be adequately detected by yellow pixels or strong solar radiation can be adequately detected by blurred pixels.

Object representation and image processing can both be used independently of each other. For example, this may be necessary if no object representation can be carried out due to the weather conditions, and the system then accesses the image processing. However, it is expressly within the meaning of the present disclosure that both object representation and image processing are used in parallel, and their results are compared with each other. As a result, a more reliable result is achieved than when using only one method.

Preferably, upon reaching a threshold value of a limited sensor range, the speed of the host vehicle is adjusted. Multiple threshold values can be specified, each corresponding to a certain degree of limitation. The speed can be adjusted gradually according to a threshold value reached or continuously to the determined limited sensor range.

Preferably, another sensor is used upon reaching a certain threshold value of a limited sensor range of a sensor. For example, if a range of a camera is severely limited by fog, switching to a RADAR-based sensor can be carried out.

A vehicle comprises at least one sensor, at least one driver assistance system and a control device, wherein the driver assistance system and the control device are configured to control a method according to the present disclosure. The advantages of the vehicle correspond to the advantages of the method according to the present disclosure.

SUMMARY OF THE DRAWINGS

The present disclosure is explained in more detail based on the figures. In the figures

DETAILED DESCRIPTION

Figure 1:
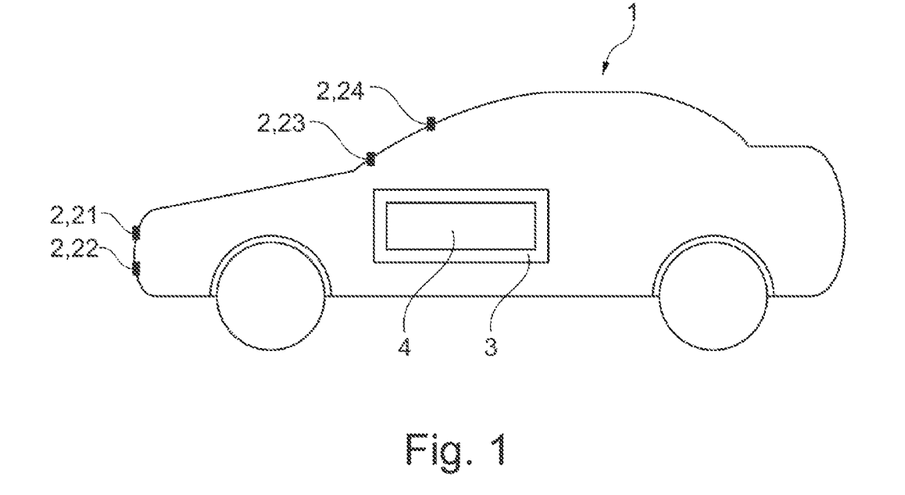
FIG. 1 shows a schematic representation of an example of the vehicle.

In the embodiment according to the representation of FIG. 1, a host vehicle 1 has a camera 21 and a radar device 22 as sensors 2, which are intended for detecting other vehicles, especially the distance to other vehicles. The host vehicle 1 has further sensors, for example, a precipitation sensor 23 and a light-dark sensor 24, which are intended for checking visibility-influencing weather or daylight conditions. The host vehicle 1 comprises a control device 3 and a driver assistance system 4. The driver assistance system 4 is implemented in the control device 3. The host vehicle 1 has automation of the L3 level, i.e., the driver assistance system recognizes the environment and can make decisions about the speed of the host vehicle 1, but the attention of the driver is necessary in order to intervene if the situation requires it.

Figure 2:
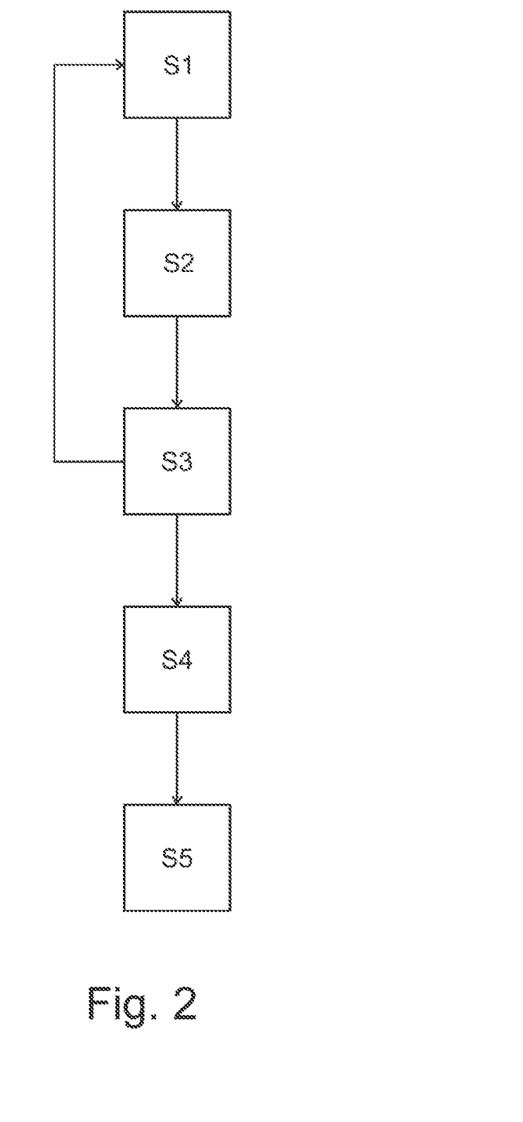
FIG. 2 shows a flow diagram of an example of a method.
Figure 6:
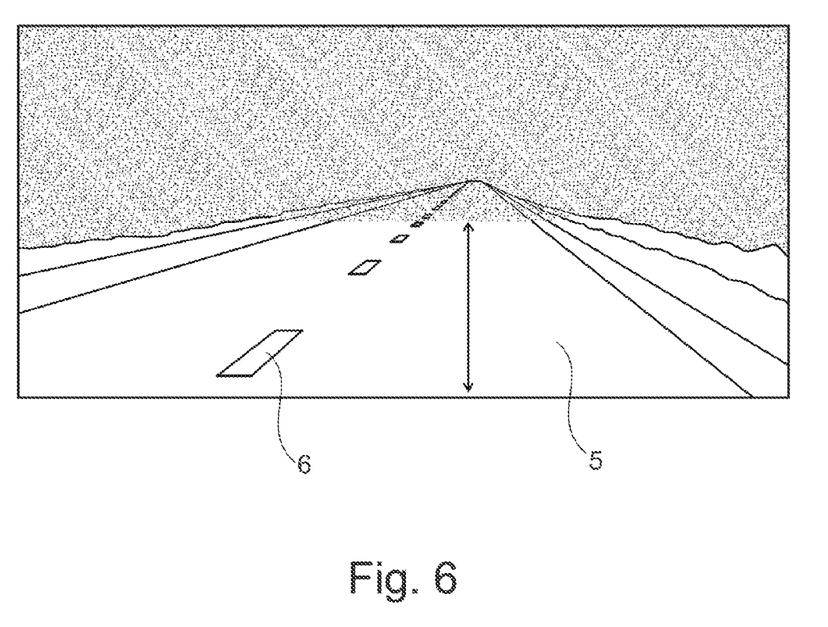
FIG. 6 shows a representation of a situation on a roadway for detecting a sensor range by image processing.

In one example of the method according to the disclosure according to the flow diagram shown in FIG. 2, an object in the direction of motion ahead of the host vehicle 1 is detected in a first step S1. The camera 21 of the host vehicle 1 is primarily used as a sensor 2 in the method. The object may be another, e.g., target, vehicle 12 (FIG. 3), or a feature in the area of a roadway 5, for example, a road marking 6 (FIG. 6).

In a second step S2, the current sensor range $R_{\mathit{eff}}$ (eff for effective) of the camera 21 is determined. Various objects are detected until they can no longer be detected or just pass into the image again. The distance is determined by comparison with known variables (for example, corresponding to a certain relative height of the target vehicle 12 being tracked, i.e. a certain distance as it appears in the camera image, for example). If the target vehicle 12 passes out of the image without it being obscured, turning off the roadway 5, or driving around a curve of the roadway 5, the current range $R_{\mathit{eff}}$ is reached at the distance of the disappearance of the target vehicle 12. Similarly, for example, the distance to a road marking 6 which just passes into the image of the camera 21 can correspond to the current range $R_{\mathit{eff}}$.

In a third step S3, the maximum range $R_{max}$ of the sensor 2 used (the camera 21) is determined. The methodology corresponds to that of step S2, wherein it comes into effect that the method is not carried out once but is constantly repeated. The method runs from step S3 back to step S1. The maximum range $R_{max}$ is an empirically determined longest distance from the host vehicle 1, which is determined during the operation of the host vehicle 1.

In step S4, the current sensor range $R_{\mathit{eff}}$ is compared with the maximum sensor range $R_{max}$. If the current sensor range $R_{\mathit{eff}}$ is similar to or equal to that determined under step S2, the current range $R_{\mathit{eff}}$ is assessed as being in the region of the maximum range $R_{max}$. If it is shorter, the range of the sensor 2 is limited. The sensor ranges can be specified in length units or as a percentage of the maximum range $R_{max}$. For classifying a limited sensor range, threshold values are specified, for example, in 10% levels.

In a fifth step S5, the control of the host vehicle 1 is adjusted according to the current sensor range $R_{eff}$. The driver is informed and can, if necessary, increase the speed again or reduce it even further if he deems it necessary. When a certain sensor range defined by a threshold value is reached, a certain speed limit is set. By way of example, sensor ranges between 90% and 100% are classified as approximately maximum ranges $R_{max}$. From 90% and then in 10% steps downwards, the speed is reduced accordingly. For example, at a current sensor range $R_{eff}$ of 90% of the maximum range $R_{max}$, the speed is lowered to 90% of the permitted speed, at a current sensor range $R_{eff}$ of 80% of the maximum range $R_{max}$ the speed is lowered to 80% of the permitted speed, etc. If the current sensor range $R_{eff}$ corresponds to the maximum sensor range $R_{max}$, then no change in speed is made. If the current sensor range $R_{eff}$ were to be temporarily limited (for example, by fog) and the speed were to be reduced accordingly, then the speed is increased again on approaching the maximum sensor range $R_{max}$.

Another measure for adjusting the control of the host vehicle 1 to a limited sensor range is changed from using the camera 21 to using the radar device 22 when the current sensor range $R_{eff}$ of the camera 21 falls below 20% of the maximum sensor range $R_{max}$. As a result, further functioning of the automatic driving mode of the host vehicle 1 is ensured. If the current sensor range $R_{eff}$ of the camera rises above 20% of the maximum sensor range $R_{max}$, then adjusting the control of the host vehicle 1 is reverted to using the camera 21. All percentages are exemplary here and can be adjusted by the person skilled in the art.

Figure 3:
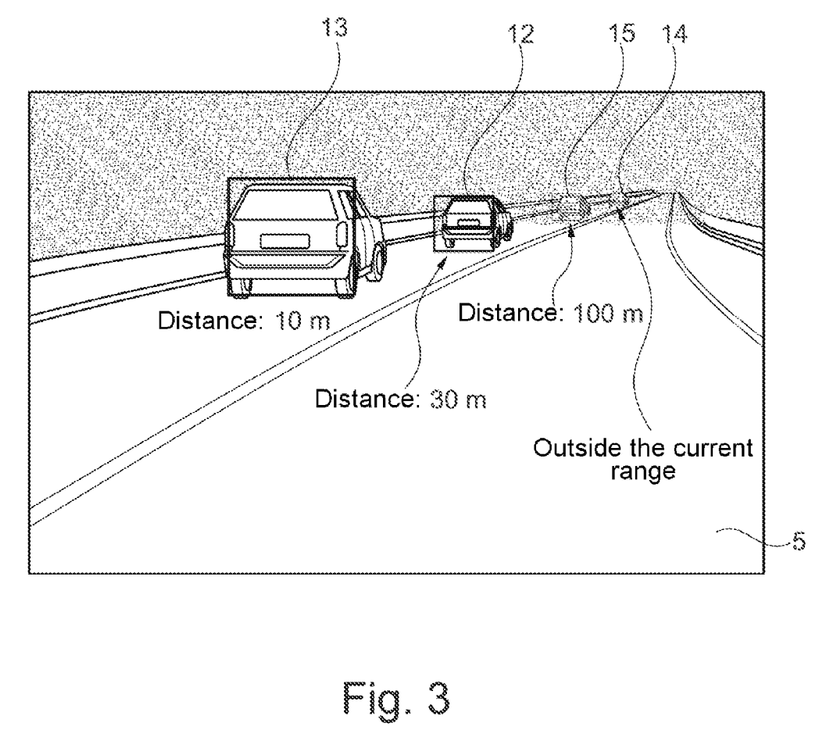
FIG. 3 shows a representation of a situation on a roadway for detecting a sensor range by object representation.

In FIG. 3, a situation on a roadway 5 is shown in which the visibility range and the current sensor range $R_{eff}$ of the camera 21 are limited by the weather conditions (fog, illustrated by the dark background pattern in the upper half of the image). Light precipitation on the windshield of the host vehicle 1 caused by fog is detected by the precipitation sensor 23. Limited daylight is detected by the light-dark sensor 24. Due to the presence of multiple vehicles on the roadway 5, the situation is suitable for checking the sensor range by means of object representation. It is illustrated that the target vehicle 12 at a distance of 30 m is detected by the camera 21, also a second target vehicle 13 at a distance of 10 m and a fourth target vehicle 15 at a distance of 100 m, but not a third target vehicle 14, although it would be in the area of the maximum sensor range $R_{max}$ under conditions without fog or heavy precipitation.

Figure 4:
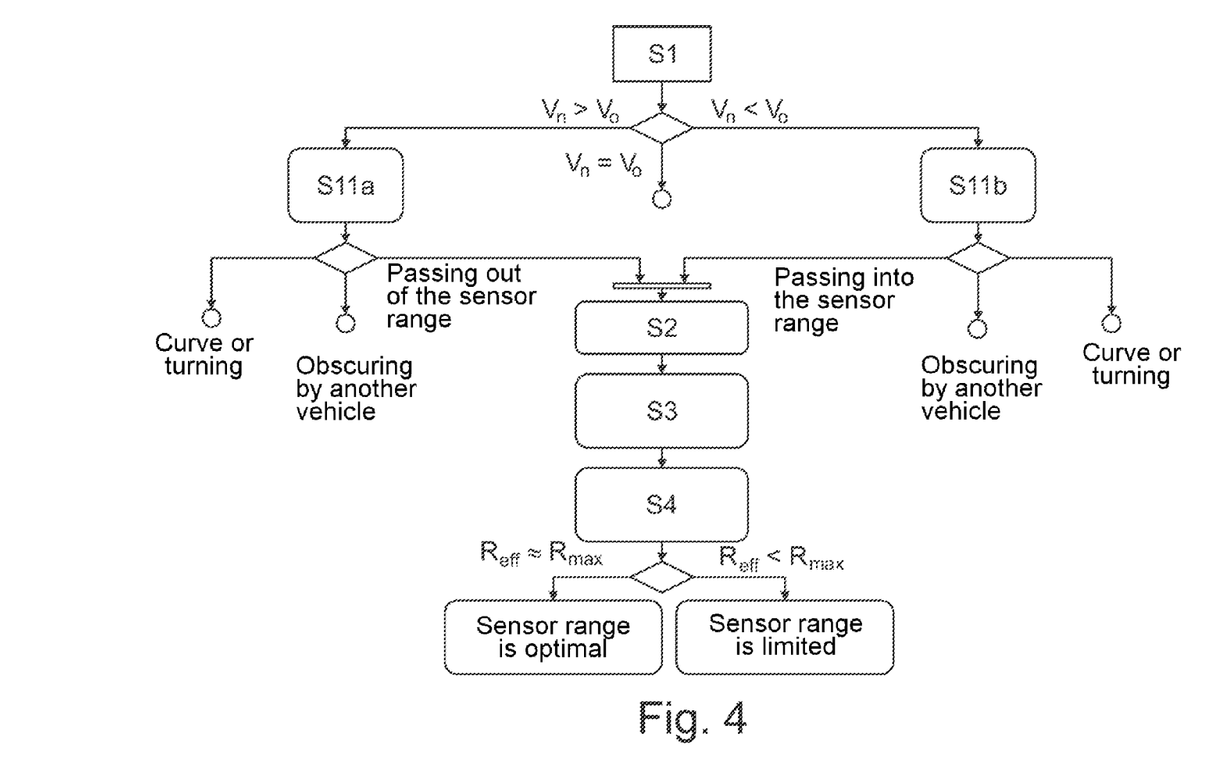
FIG. 4 shows a flow diagram of an example of a method by object representation.

For checking the current sensor range $R_{eff}$ (i.e., of the camera 21) of the host vehicle 1 in the situation of FIG. 3, an object representation algorithm according to FIG. 4 is suitable.

In step S1, a new object is detected (target vehicle 12). The speed of the target vehicle 12 relative to the host vehicle 1 is checked. If the target vehicle 12 and the host vehicle 1 have the same speed ($v_n=v_o$), then the analysis is not continued, and the target vehicle 12 is removed from the analysis. Here $v_n$ stands for the speed of the newly detected vehicle (n for new) and $v_o$ for the speed of the host vehicle 1 (o for own)

The target vehicle 12 is faster ($v_n>v_o$) and is tracked in step S11a until it is no longer detected. After the target vehicle 12 can no longer be detected, the reasons for the loss are analyzed. If the target vehicle 12 has driven around a curve or turned, it is removed from the analysis. If the target vehicle 12 is obscured by another (third) target vehicle 13, it is removed from the analysis. If none of the latter reasons applies, it is probably out of range of the camera 21. Thus, the method runs to step S2 by measuring the distance to the point of disappearance as the current sensor range $R_{eff}$ of the camera 21. The longest range measured during the operation of the host vehicle 1 is stored continuously in step S3. In step S4, the current sensor range $R_{eff}$ is compared with the maximum sensor range $R_{max}$. If the current sensor range $R_{eff}$ is the same as or up to 90% of the maximum sensor range $R_{max}$, it is classified as optimal. If it is less than 90%, the current sensor range $R_{eff}$ is classified as limited.

The third target vehicle 14 is slower than the host vehicle 1 ($v_n<v_o$) and is captured by the camera 21 when it is detected by the camera 21 in step S11b. The reasons why it was detected are analyzed. If the third target vehicle 14 has driven around a curve or turned, it is removed from the analysis. If the third target vehicle 14 was obscured by another vehicle (the fourth target vehicle 15), it is removed from the analysis. If none of the latter reasons applies, it has probably just come within the range of the camera 21 (here: out of the fog). Thus, the method runs to step S2, in which the distance to the point of appearance is measured as the current sensor range $R_{eff}$ of the camera 21. The longest range measured during the operation of the host vehicle 1, which corresponds to the maximum sensor range $R_{max}$, is stored continuously in step S3. In step S4, the current sensor range $R_{eff}$ is compared with the maximum sensor range $R_{max}$. If the current sensor range $R_{eff}$ is the same as or up to 90% of the maximum sensor range $R_{max}$, it is classified as optimal. If it is less than 90%, the current sensor range $R_{eff}$ is classified as limited. From this it can be assumed here that the fog limits the current sensor range $R_{eff}$ to 40% of the maximum sensor range $R_{max}$. Thus, in step S5 according to FIG. 2, the speed is lowered to 40% of the speed allowed in the area.

Figure 5:
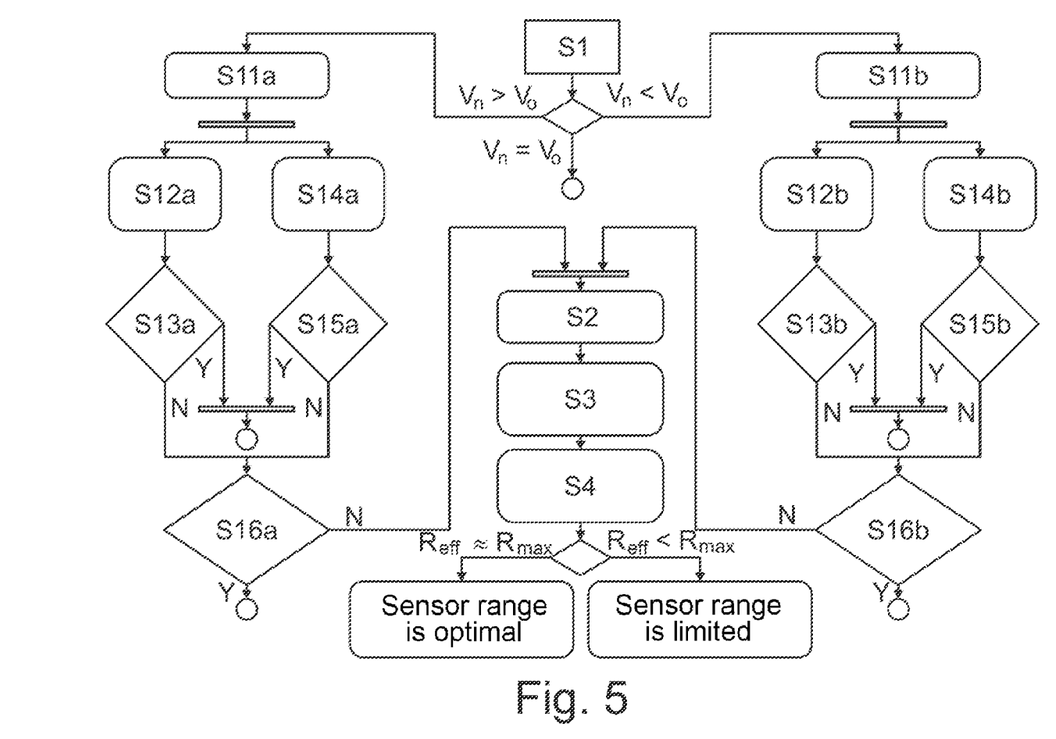
FIG. 5 shows a flow diagram of an example of a method by object representation.

In FIG. 5, the object representation algorithm is presented in more detail. With $v_n>v_o$, after step S11a the last measured angular distance to the object captured by the detection (the target vehicle 12) is determined, and the object's direction of motion is determined. For distance assessment, the last known angular distance is determined in step S12a and it is determined in step S13a whether this angular distance was close to the edge of the field of view of the camera 21 or whether the target vehicle 12 has left the lane. If so (Y for yes), it is assessed that the object has turned or driven around a curve and is removed from the analysis. If not (N for no), a check is carried out in step 16a as to whether the target vehicle 12 was obscured by another target vehicle 13. If so, the target vehicle 12 is removed from the analysis. If not, it is assessed that the target vehicle 12 has passed out of range of the camera 21, and the method runs to step S2 and continues successively, as described for FIG. 4.

For the direction of movement, the last known direction of movement is determined in step S14a, and a check is carried out in step S15a as to whether the direction of movement implies that the target vehicle 12 has moved out of the lane. If so, then it is assessed that the target vehicle 12 has turned or driven around a curve and it is removed from the analysis. If not (N for no), a check is carried out in step 16a as to whether the target vehicle 12 was obscured by another target vehicle 15. If so, the target vehicle 12 is removed from the analysis. If not, it is assessed that the target vehicle 12 has passed out of range of the camera 21, and the method runs to step S2 and continues successively as described for FIG. 4.

With $v_n<v_o$ after step S11b the first measured angular distance to the object passing into detection (the third vehicle 14) is determined, and the object's direction of movement is determined. For distance assessment, the first known angular distance is determined in step S12b, and it is determined in step S13b whether this angular distance was close to the edge of the field of view of the camera 21 or whether the object has driven into the lane. If so (Y for yes), it is assessed that the object has turned or driven around a curve, and it is removed from the analysis. If not (N for no), a check is carried out in step 16b as to whether the third target vehicle 14 was obscured by another target vehicle 15. If so, the third vehicle 14 is removed from the analysis. If not, it is assessed that the third target vehicle 14 has passed into the range of the camera 21, and the method runs to step S2 and continues successively as described for FIG. 4.

For the direction of movement, the first known direction of movement is determined in step S14b and, it is determined in step S15b whether the direction of movement implies that the third target vehicle 14 has moved into the lane. If so, then it is assessed that the third target vehicle 14 has turned or driven around a curve and it is removed from the analysis. If not (N for no), a check is carried out in step 16b as to whether the third target vehicle 14 was obscured by another target vehicle 15. If so, the third target vehicle 14 is removed from the analysis. If not, it is assessed that the third target vehicle 14 has passed out of range of the camera 21, and the method runs to step S2 and continues successively as described for FIG. 4.

In FIG. 6, another situation on a roadway 5 is shown, in which the view is limited by the weather conditions (fog, illustrated by the dark background pattern in the upper half of the image). Since no vehicles can be seen on the roadway 5 and objects on the side of the roadway 5 are only dimly recognizable, this situation is suitable for checking the sensor range of the camera 21 by means of image processing.

Fog is detected here because there are only white pixels in the upper half of the image and no other colored pixels that correspond to a representation of trees or sky. In a first branch of the method, the image processing program is oriented to objects on or next to the roadway 5, such as road markings 6, a road edge, guide posts and guardrails. For example, the image processing program uses algorithms such as the Canny algorithm and/or the Hough transform to detect objects and associate a distance with the detected objects. The distance to the most distant object corresponds to the current sensor range $R_{eff}$.

In a second branch of the method, alternatively or in addition to this the system/program can also perform a classification of the sensor range at pixel level. The highest non-white pixel in the image is selected, i.e., in FIG. 6, the highest non-white pixel of the street, before the image becomes white towards the upper area. A distance which corresponds to the current sensor range $R_{eff}$, and which is indicated in FIG. 6 by the arrow drawn, is then also associated with this area marked by the highest non-white pixel.

Figure 7:
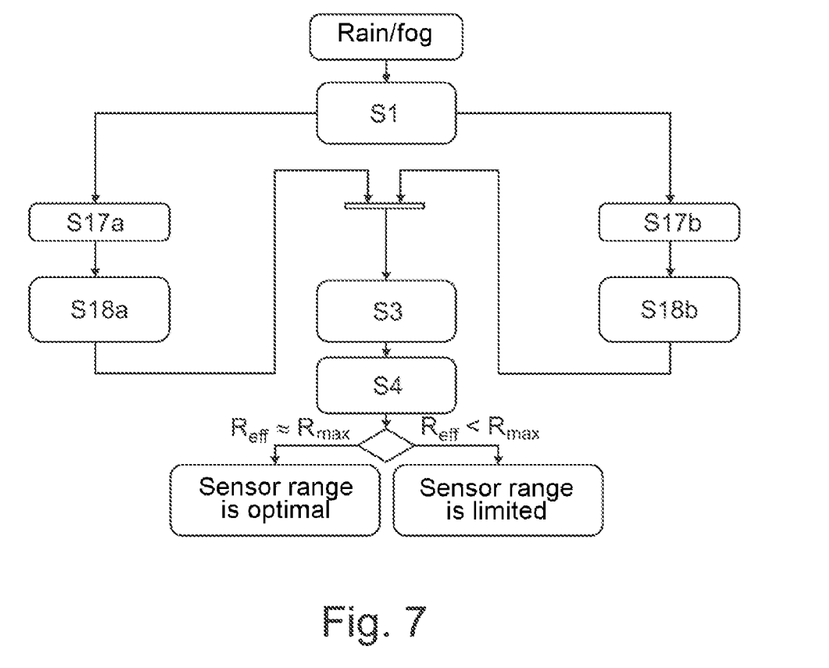
FIG. 7 shows a flow diagram of an example of a method using image processing.

For checking the current sensor range $R_{eff}$ (i.e., of the camera 21) of the host vehicle 1 in the situation of FIG. 6, an image processing algorithm according to FIG. 7 is suitable. Here an area in the image field, which is suitable for determining the current sensor range $R_{eff}$ (also referred to as ROI, region of interest), is selected in step S1 under the condition that fog or rain has been detected (for example, by the precipitation sensor 23 and/or by white pixels in the upper half of the image). With the object-oriented method, the marking of the center strip 6 is detected in step S17a in order to associate a distance with the most distant road marking 6 (see the drawn arrow) in step S18a. Step S18a corresponds to the second step S2 of the general method. In step S3, a maximum value is continuously stored during multiple repetitions of the method in order to detect the maximum sensor range $R_{max}$. In step S4, the current sensor range $R_{eff}$ is compared with the maximum sensor range $R_{max}$. Under the foggy conditions, the current sensor range $R_{eff}$ of the camera 21 is significantly reduced to 30% of the maximum sensor range $R_{max}$. According to step S5 of the method according to FIG. 2, the speed is thus reduced to 30% of the initial speed.

In the pixel-oriented method, in step S17b the pixels of the roadway 5 are detected, i.e., the non-white pixels that differ from the white ones that characterize the fog. In step S18a, a distance is associated with the most distant road marking 6. Step S18b corresponds to the second step S2 of the general method. In step S3, a maximum value is continuously stored during multiple repetitions of the method in order to detect the maximum sensor range $R_{max}$. In step S4, the current sensor range $R_{eff}$ is compared with the maximum sensor range $R_{max}$. Under the foggy conditions, the current sensor range $R_{eff}$ of the camera 21 is significantly reduced to 30% of the maximum sensor range $R_{max}$. According to step S5 of the method according to FIG. 2, the speed is thus reduced to 30% of the initial speed.

In this way, the current sensor range $R_{max}$ of the camera 21 can be determined. The image processing approach can be performed if object representation is not possible. However, it can also be carried out in addition to object representation, wherein the results of the methods are reconciled with each other and thus become more accurate.

REFERENCE CHARACTER LIST 1 host vehicle
12 target vehicle
13 second target vehicle
14 third target vehicle
15 fourth target vehicle
2 sensor
21 camera
22 radar device
23 precipitation sensor
24 light-dark sensor
3 control device
4 driver assistance system
5 roadway
6 road marking

The invention claimed is:
1. A method for controlling a host vehicle, comprising:
  detecting, via a sensor, at least one object in a direction of movement ahead of the host vehicle;
  determining a current sensor range based on the detected at least one object;
  determining a maximum sensor range based on the sensor;
  comparing the current sensor range with the maximum sensor range; and
  upon determining the current sensor range is less than the maximum sensor range by at least a predetermined threshold, updating a driving parameter of the host vehicle based on the current sensor range.
2. The method of claim 1, wherein the at least one object is one of a target vehicle, a traffic sign, a road boundary, a road marking, and a plant alongside a roadway.
3. The method of claim 1, wherein the sensor is one of a camera, a radar device, and a lidar device.

4. The method of claim 1, further comprising determining the current sensor range based on object representation using target vehicles.

5. The method of claim 1, further comprising:
selecting a target vehicle as the at least one object based on the target vehicle moving at a different speed than the host vehicle;
based on a target vehicle speed being greater than a host vehicle speed, tracking the selected target vehicle up to a distance and a time until the selected target vehicle can no longer be detected; and
based on the target vehicle speed being less than the host vehicle speed, tracking the selected target vehicle from a distance and a time at which the selected target vehicle was first detected.

6. The method of claim 5, further comprising preventing selection of the target vehicle as the at least one object based on at least one of a) the target vehicle moving at the same speed as the host vehicle, b) the target vehicle departing the sensor range due to being obscured by other vehicles, a lane change, turning, and cornering, and c) the target vehicle entering the sensor range due to being obscured by other vehicles, a lane change, turning, and cornering.

7. The method of claim 1, further comprising determining the current sensor range based on determining, via an image, a distance from the at least one detected object to the host vehicle.

8. The method of claim 1, further comprising:
identifying, in an image, pixels that correspond to environmental conditions that limit the current sensor range based on respective colors of the pixels; and
determining the current sensor range based on the identified pixels.

9. The method of claim 1, wherein the driving parameter is a host vehicle speed.

10. The method of claim 1, further comprising, upon determining the current sensor range is less than the maximum sensor range by at least a second predetermined threshold, operating the host vehicle based on another type of sensor than the sensor, wherein the second predetermined threshold is less than the predetermined threshold.

11. A system for a host vehicle, comprising:
a sensor; and
a control device configured to:
detect, via a sensor, at least one object in a direction of movement ahead of the host vehicle;
determine a current sensor range based on the detected at least one object;
determine a maximum sensor range based on the sensor;
compare the current sensor range with the maximum sensor range; and
upon determining the current sensor range is less than the maximum sensor range by at least a predetermined threshold, update a driving parameter of the host vehicle based on the current sensor range.

12. The system of claim 11, wherein the at least one object is one of a target vehicle, a traffic sign, a road boundary, a road marking, and a plant alongside a roadway.

13. The system of claim 11, wherein the sensor is one of a camera, a radar device, and a lidar device.

14. The system of claim 11, wherein the control device is further configured to determine the current sensor range based on object representation using target vehicles.

15. The system of claim 11, wherein the control device is further configured to:
select a target vehicle as the at least one object based on the target vehicle moving at a different speed than the host vehicle;
based on a target vehicle speed being greater than a host vehicle speed, track the selected target vehicle up to a distance and a time until the selected target vehicle can no longer be detected; and
based on the target vehicle speed being less than the host vehicle speed, track the selected target vehicle from a distance and a time at which the selected target vehicle was first detected.

16. The system of claim 15, wherein the control device is further configured to prevent selection of the target vehicle as the at least one object based on at least one of a) the target vehicle moving at the same speed as the host vehicle, b) the target vehicle departing the sensor range due to being obscured by other vehicles, a lane change, turning, and cornering, and c) the target vehicle entering the sensor range due to being obscured by other vehicles, a lane change, turning, and cornering.

17. The system of claim 11, wherein the control device is further configured to determine the current sensor range based on determining, via an image, a distance from the at least one detected object to the host vehicle.

18. The system of claim 11, wherein the control device is further configured to:
identify, in an image, pixels that correspond to environmental conditions that limit the current sensor range based on respective colors of the pixels; and
determine the current sensor range based on the identified pixels.

19. The system of claim 11, wherein the driving parameter is a host vehicle speed.

20. The system of claim 11, wherein the control device is further configured to, upon determining the current sensor range is less than the maximum sensor range by at least a second predetermined threshold, operate the host vehicle based on another type of sensor than the sensor, wherein the second predetermined threshold is less than the predetermined threshold.

* * * * *